Oct. 19, 1954  C. B. GIBBS  2,692,085
COUNTING DEVICE
Filed March 29, 1952
5 Sheets-Sheet 1
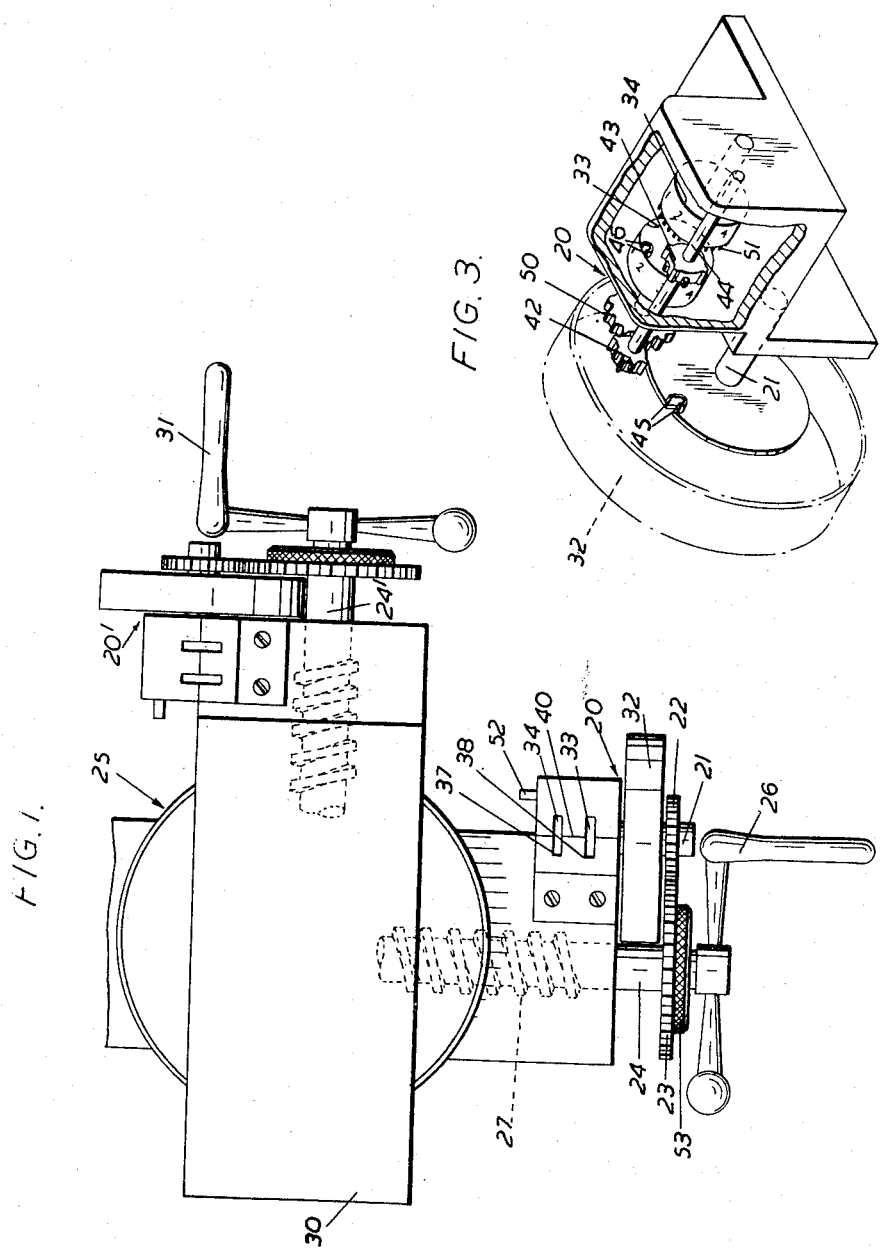
Inventor
Charles Bernard GIBBS
By *[signature]*
Attorney Oct. 19, 1954     C. B. GIBBS     2,692,085
COUNTING DEVICE
Filed March 29, 1952     5 Sheets-Sheet 2
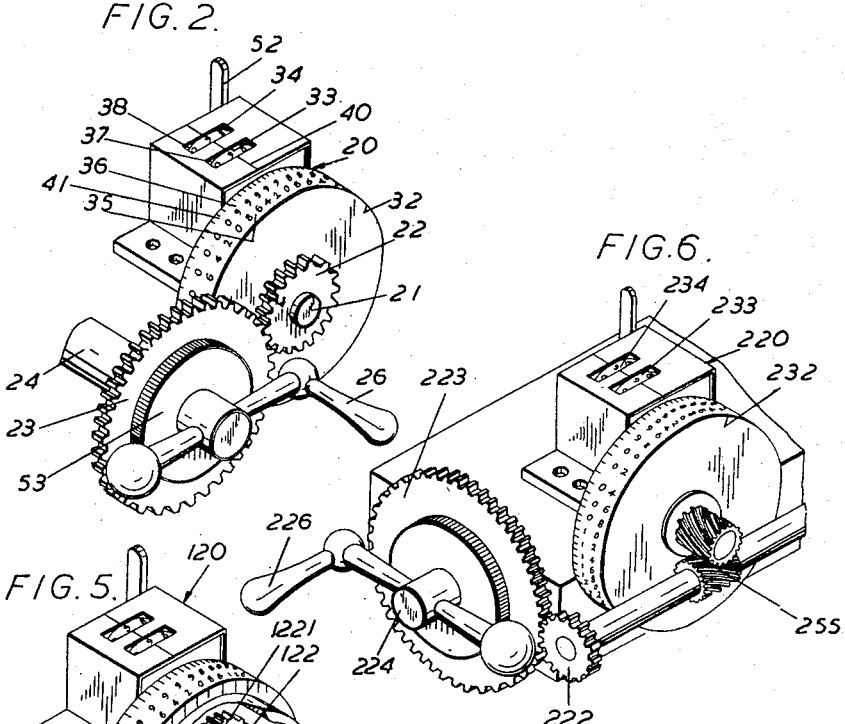
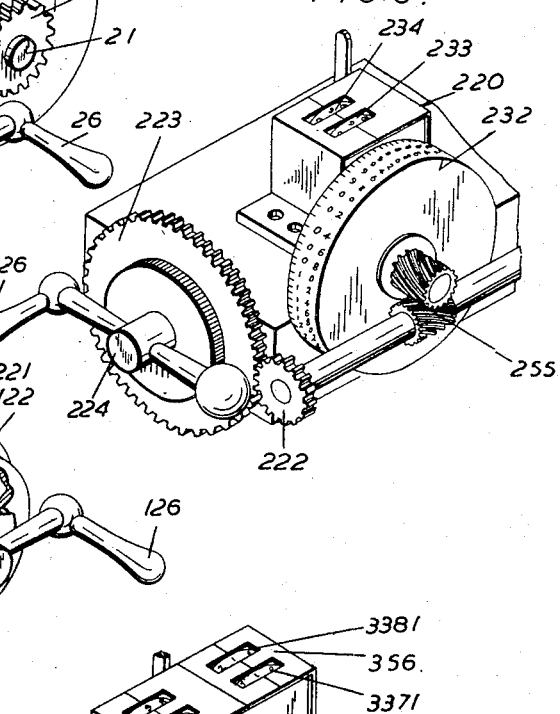
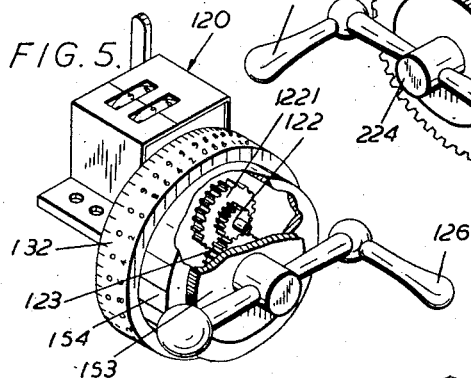
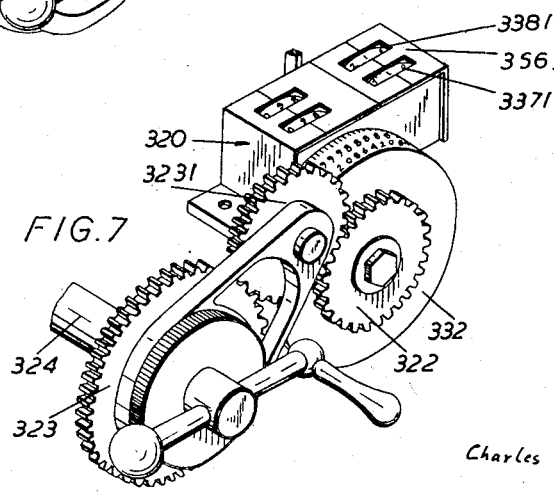
Inventor
Charles Bernard GIBBS
By *[signature]*
Attorney Oct. 19, 1954
C. B. GIBBS
2,692,085
COUNTING DEVICE
Filed March 29, 1952
5 Sheets-Sheet 3
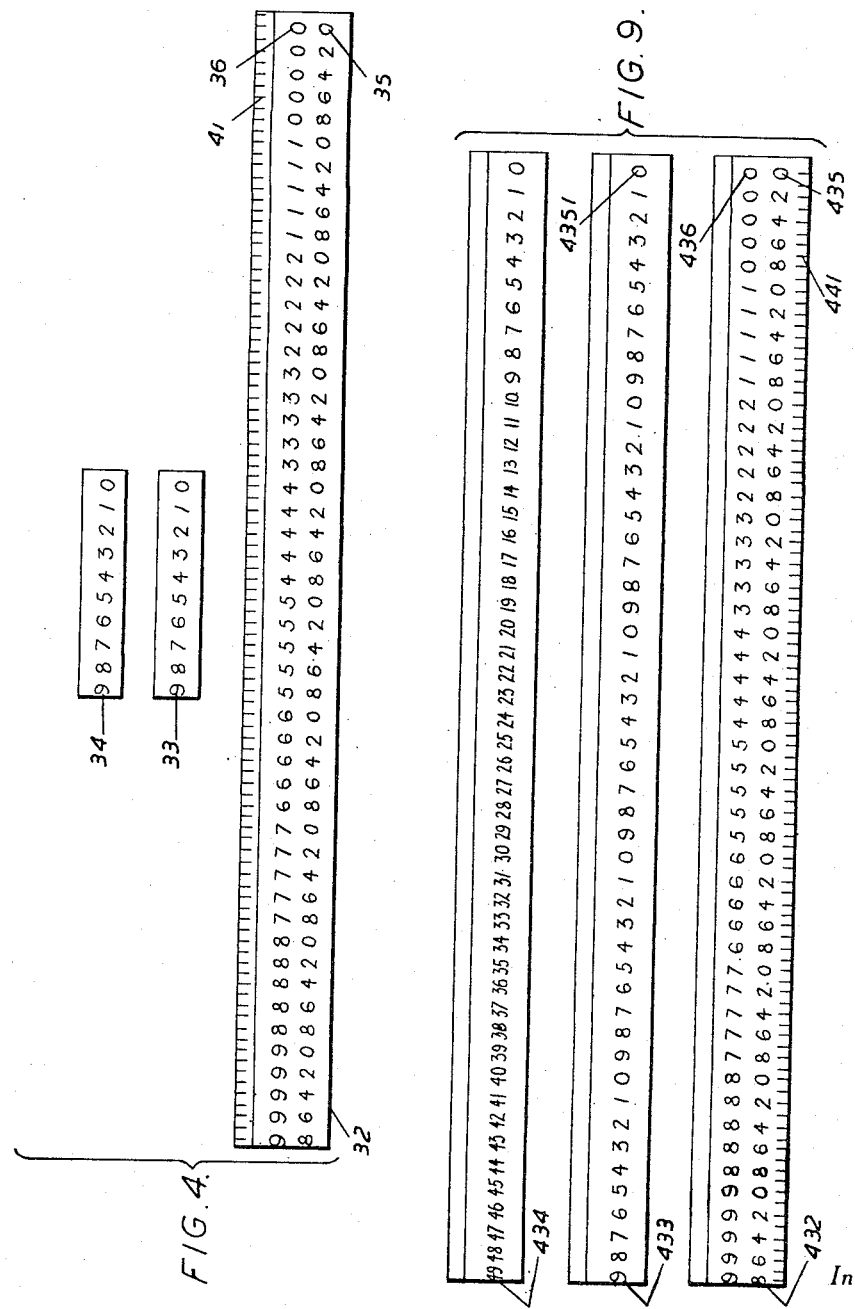
Inventor
Charles Bernard Gibbs
By
Attorney Oct. 19, 1954
C. B. GIBBS
2,692,085
COUNTING DEVICE
Filed March 29, 1952
5 Sheets-Sheet 4
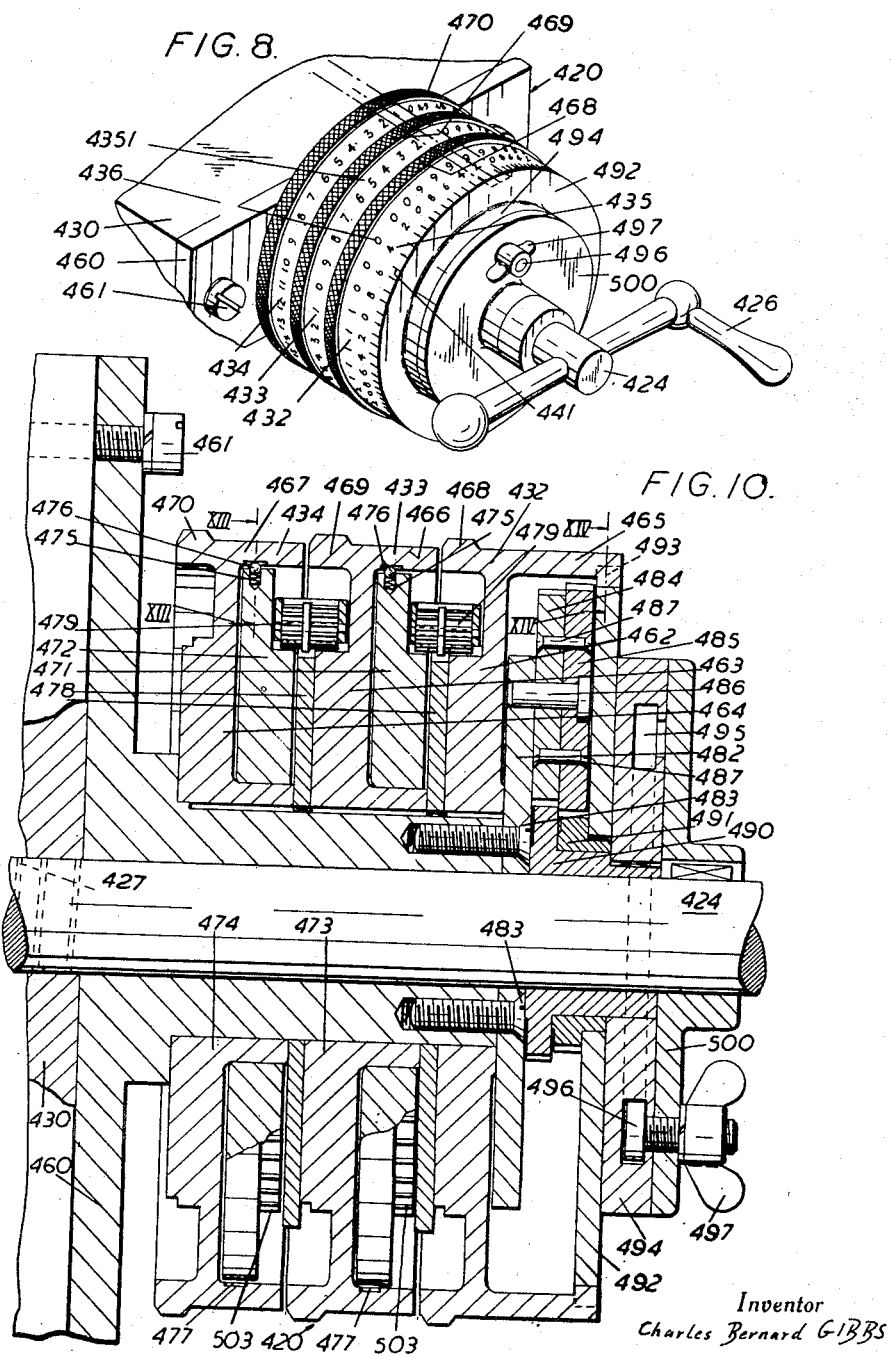
Inventor
Charles Bernard GIBBS
By
Attorney Oct. 19, 1954
C. B. GIBBS
COUNTING DEVICE
2,692,085
Filed March 29, 1952
5 Sheets-Sheet 5
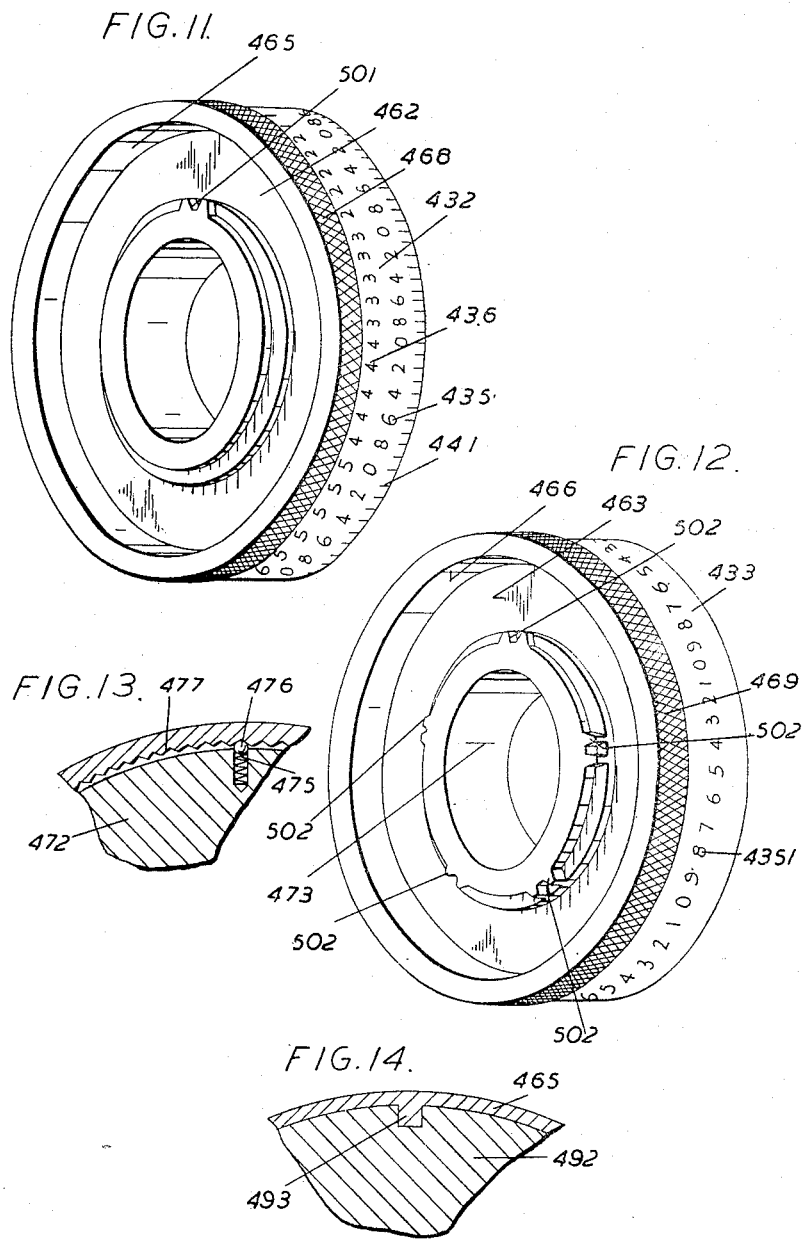

Patented Oct. 19, 1954

2,692,085

UNITED STATES PATENT OFFICE 2,692,085

COUNTING DEVICE

Charles Bernard Gibbs, Cambridge, England, assignor to English Numbering Machines Limited, Enfield, England, a British company Application March 29, 1952, Serial No. 279,284

Claims priority, application Great Britain May 31, 1951

15 Claims. (Cl. 235—103)

The present invention relates to counting devices, especially for precision measuring purposes. The term "measuring" as herein used shall include adjusting a value, or setting to a given value, or displacing through a given distance.

It is an object of the invention to provide a counting device that may replace, in some cases, counting devices as now generally used, and which may with particular advantage be used in connection with machine tools for adjusting a member of a machine tool, such as a workholder, a table, a slide, a tool, or for setting the member at a given distance from a datum point, or for displacing it through a given distance from one position to another. The invention may, however, advantageously also be applied to gauges, particularly for measuring distances.

For these and similar purposes, hitherto devices have been used each comprising a screw-threaded cylindrical rotatable spindle which, on rotation, is axially displaced relatively to a stationary member, for example a cylindrical internally screw-threaded stationary sleeve, the spindle having a sleeve-like actuating barrel bodily rotatable therewith and overlapping the stationary member so that the free edge of the barrel slides along the member when the barrel and the spindle are rotated. At its free edge the barrel carries a micrometer dial co-operating with a graduated index line of the stationary member. The pitch of the screw-threads of the spindle and the graduation of the index line are so related to each other that the free edge of the barrel slides along the member through the distance of one unit of the graduation of the index line when the barrel and the spindle perform a predetermined integral number of revolutions, fractions of a rotation being read off against the index line on the micrometer dial. However, this and similar known arrangements have the drawback that the user of the device has carefully to remember, at each reading, the number of revolutions performed by the barrel and the spindle after the edge of the barrel has passed the last unit shown on the index line. This necessitates most careful checking of each measurement if errors are to be avoided, and yet errors are almost bound to occur owing to the human factor involved.

It is accordingly another object of the present invention to avoid or at least to decrease this drawback.

It is a more specific object of the invention to enable the user directly to read off a measurement with the required accuracy without the necessity of computation.

It is a subsidiary object of the invention to arrange for an automatic multiplication of the value measured, whereby the user is enabled directly to read off a multiplied value. For example, if a length corresponding to the radius of a cylinder has in fact been measured, it is sometimes desirable directly to read off the length of the corresponding diameter, or of the circumference of the cylinder.

These and other objects and advantages of the invention will become apparent to those skilled in the art from the following detailed description of some embodiments of the invention when read in conjunction with the accompanying drawings, in which:

Fig. 1 is a plan view of a first counting device of the invention as applied to a machine tool;

Fig. 2 is a perspective view of the counting device of Fig. 1, the machine tool being omitted;

Fig. 3 is a somewhat diagrammatic perspective view showing the transfer mechanism of the counting device of Figs. 1 and 2;

Fig. 4 shows the scales of the counting device of Figs. 1 to 3 developed in a plane;

Fig. 5 is a perspective view of a modified counting device;

Fig. 6 is a perspective view of another modified counting device;

Fig. 7 is a perspective view of a further modified counting device;

Fig. 8 is a perspective view of still another counting device of the invention;

Fig. 9 shows the scales of the counting device of Fig. 8 developed in a plane;

Fig. 10 is an axial section through the counting device of Fig. 8;

Fig. 11 is a perspective view, on a larger scale, of the first number wheel of the counting device of Figs. 8, 9, and 10;

Fig. 12 is a similar perspective view of the second number wheel of the counting device of Figs. 8, 9, and 10;

Fig. 13 is a section along the line XIII—XIII of Fig. 10; and

Fig. 14 is a section along the line XIV—XIV of Fig. 10.

The present invention consists in a counting device comprising a plurality of number wheels arranged to indicate digits of a number, and a transfer mechanism operative between adjacent number wheels for transferring movement of a number wheel (except the last one) to the next following number wheel only when the first mentioned number wheel rotates through a predetermined position, wherein a number wheel is provided with a plurality of sequences of different digits and with a plurality of trains of recurrent digits, the said sequences and trains of digits being so arranged that at least two digits of a number indicated by the device are readable from the said number wheel. Preferably, the plurality of sequences of different digits equals the plurality of trains of recurrent digits, so that each sequence corresponds to one train. Corresponding sequences and trains of the digits may be arranged side by side. Corresponding sequences and trains of digits may comprise the same number of digits. All the sequences and trains of digits of the number wheel may comprise the same number of digits.

The term "digit" is herein intended to mean any of the numerals 1, 2, ... 9, 0. Thus, a number shown by a counting device having more number wheels than one is considered always to have more digits than one. For example, the number "0029" is deemed to have four digits. The digits are counted from right to left, so that in the example "9" is the first digit, "2" is the second digit, and so on. Analagously, the term "first number wheel" is intended to indicate that number wheel which carries the first digit, the term "last number wheel" is intended to indicate that number wheel which carries the last digit. The number wheels will, of course, be counted from the first to the last number wheel. However, it will be seen from the last preceding paragraph that the plurality of digits of a number shown by the device is higher than the plurality of number wheels provided in the device, since at least one of the number wheels indicates at least two digits of a number shown by the device.

In order to accommodate the required plurality of sequences of different digits and the plurality of trains of recurrent digits on a number wheel of ordinary size, the digits could be provided on the circumference of the number wheel in microscopic size, and the reading of the indications could be effected by means of a magnifying glass which preferably is fixed to the device. Preferably, however, the number wheel provided with the sequences and trains of digits has such a diameter that the sequences and trains of digits can be accommodated on the said number wheel in such a size that they are readable therefrom with the unaided normal eye. The said number wheel may have a larger diameter than the other number wheel or number wheels. The number wheel of larger diameter may be arranged eccentrically with respect to the other number wheel or number wheels so as to enable all the digits of a number indicated by the device to be in substantial alignment. The digits may be arranged along the periphery of the respective number wheel, the peripheries of all the number wheels being substantially tangential to a common plane. Preferably, the sequences and trains of digits are arranged on the first number wheel, the arrangement being such that the first two digits of a number indicated by the device are readable from the first number wheel. The first number wheel may be coupled by means of a gear to a rotatable spindle for operating the counting device and for displacing a member in the axial direction of said operating spindle, the gearing ratio of said gear being such that the device indicates the length of a displacement of said member or a multiple thereof, in a predetermined unit or sub-unit. The first number wheel may be provided with ten sequences of the digits "0, 2, 4, 6, 8" and with ten trains of five recurrent digits from "0" to "9," the digits of the sequences and trains lying side by side in such a manner that the digit "0" of each sequence lies adjacent the first digit of a train of recurrent digits.

Alternatively, all the number wheels may be of substantially equal size and arranged co-axially. In this case, the sequences and trains of digits are preferably, again, arranged on the first number wheel, the arrangement being such that the first two digits of a number indicated by the device are readable from the first number wheel, the second number wheel being provided with a plurality of sequences of different digits. Again, the first number wheel may be provided with ten sequences of the digits "0, 2, 4, 6, 8" and with ten trains of five recurrent digits from "0" to "9" the digits of the sequences and trains lying side by side in such a manner that the digit "0" of each sequence lies adjacent the first digit of a train of recurrent digits, the second number wheel being provided with five sequences of the digits "0, 2, 4, 6, 8." A third number wheel may be provided, the transfer mechanism between the second and third number wheel being such that, during one complete revolution of the second number wheel, rotation thereof is transferred to the third number wheel five times, namely each time the second number wheel rotates through one of five predetermined positions, adjacent positions being separated from each other by arcs corresponding substantially to 72°. Preferably, the counting device is mounted on a main bracket carried by a rotatable spindle for operating the counting device and for displacing a member in the axial direction of said operating spindle, the first number wheel being coupled to said operating spindle by a gear, the gear ratio of which is such that the device indicates the length of a displacement of said member, or a multiple thereof, in a predetermined unit or sub-unit. The number wheels may be arranged co-axially with the operating spindle.

In any case, means may be provided for resetting the counting device to zero. Means may also be provided for variably selecting a predetermined number to be counted, the said means causing a control effect, when the counting device reaches the said predetermined number.

If the sequences and trains of digits are provided on the first number wheel, the first number wheel may accommodate on its periphery ten sequences of different digits, and ten trains of recurrent digits, the sequences and the trains, as well as their respective digits, being arranged side by side and in substantial alignment, the number of digits of each sequence or train being either 10, or 5, or 2, a coupling being provided for coupling the first number wheel to a rotatable spindle for operating the device and for rectilinearly displacing a member, the said coupling being so designed in relation to the displacement of the said member caused by one complete revolution of the spindle that the circumference of the first number wheel rotates through an arc corresponding substantially to the distance between adjacent digits of the sequences, from centre to centre, when the said displacement equals $1/1000$, or $2/1000$, or $5/1000$ respectively of a predetermined unit of length, whereby the digits of the sequences directly indicate, without interpolation, $1/1000$ or $2/1000$ or $5/1000$ respectively of unit of length of the displacement, the digits of the trains indicate 1/100 of said unit, the digits of the second number wheel indicate 1/10 of said unit and those of possibly following number wheels indicate units, 10 units, and so on. Additionally, 100 markings may be provided on the circumference of the first number wheel, the centres of the digits of the sequences being in substantial alignment with the said markings, or with every second marking, or with every fifth marking depending on whether each sequence contains 10, 5, or 2 digits, whereby, by ascertaining registering of a marking with a reference mark, in the case of 10 digits direct reading is facilitated, and in the case of 5 or 2 digits reading of 1/1000 of the unit of length is enabled without computation. The coupling may be so designed in relation to the displacement of the said member of the machine tool caused by one complete revolution of the spindle that the circumference of the first number wheel rotates through an arc corresponding substantially to the distance between adjacent digits of the sequences, from centre to centre, when the said displacement equals a multiple of 1/1000, or 2/1000, or 5/1000 respectively of the predetermined unit of length, whereby the digit of the sequences directly indicates, without computation, a corresponding multiple of 1/1000 of said unit, the digit of the train indicates the same multiple of 1/100 of said unit, and so on. The coupling may comprise, or form, a variable gear, whereby to enable the predetermined unit of length and/or the value of the multiple to be varied to meet different requirements.

The arrangement of Figs. 1 to 4 comprises a counting device generally indicated by reference numeral 20 having a shaft 21 carrying a gear wheel 22 for operating a first number wheel 32, the gear wheel 22 meshing with a gear wheel 23 frictionally connected by means of a friction disc 53 to an operating spindle 24 of a machine tool generally indicated by reference numeral 25. The spindle 24 is rotatable by means of a handle 26 and has screw threads 27 for displacing a member 30 of the machine tool, for example a work-holder, a table, a cutting tool, in the axial direction of the spindle 24 when the operating spindle 24 is rotated by rotating the handle 26. Another handle 31 serves in a well known manner to displace the member 30 perpendicularly to the operating spindle 24.

The counting device 20 is shown as comprising three number wheels 32, 33, and 34, of which the first number wheel 32 is of larger diameter than the other number wheels 33 and 34. If desired, the number wheel 34 may be omitted, or else the number wheel 34 may be followed by one or more similar further number wheels.

Between the number wheels 32 and 33, and also between the number wheels 33 and 34, transfer mechanisms are provided, which comprise pinions 42 and 43 respectively (see Fig. 3) rotatably mounted on an auxiliary shaft 44 and operable by pairs of teeth 45 and 46 respectively provided at one side of the number wheels 32 and 33. The pinion 42 meshes with a toothed wheel 50 connected to the number wheel 33 to rotate the same, while the pinion 43 meshes with teeth 51 provided at one side of the number wheel 34. On each complete revolution of the number wheel 32 or the number wheel 33, its respective two teeth 45 or 46 come once into engagement with the respective pinion 42 or 43 to rotate the same by one step, whereby the toothed wheel 50 and therewith the number wheel 33, or the teeth 51 and therewith the number wheel 34 are rotated by one step to indicate the next digit on the circumference of the number wheel 33 or 34 respectively. Such transfer mechanisms are well known in the art and, of course, the transfer mechanisms shown in Fig. 3 may be replaced by any other suitable known transfer mechanisms.

The first number wheel 32 accommodates on its periphery ten sequences 35 each composed of different digits "2, 4, 6, 8, 0" (see particularly Fig. 4) and ten trains 36 each composed of a different recurrent digit, which is repeated five times in each train. The sequences 35 and the trains 36, as well as their respective digits, are arranged side by side and in alignment with each other. The counting device has windows 37 and 38 for observing digits of the said other number wheels 33 and 34, and an index line 40 against which digits of the first number wheel 32 can be read off. The first number wheel 32 also has a hundred markings 41 adjacent the index line 40 for facilitating reading off.

The gearing ratio due to the gear wheels 22 and 23 coupling the counting device 20 to the operating spindle 24 is so related to the pitch of the screw threads 27 of the operating spindle 24 and thus to the displacement of the member 30 of the machine tool 25 that, on rotation of the operating spindle 24, the circumference of the first number wheel 32 rotates through an arc that corresponds to the distance between adjacent digits of the sequences 35, from centre to centre, when the displacement of the member 30 equals 2/1000 of a predetermined unit of length. Thereby the digits of the sequences 35 directly indicate 2/1000 of the unit of length of the displacement, the markings 41 enabling direct reading of a displacement of 1/1000 of the predetermined unit of length. Thereby it is achieved that the markings 41 and the digits of the sequences 35 indicate 1/1000 of the unit of length of a displacement of the member 30, the digits of the trains 36 indicate 1/100 of the said units, the digits of the second number wheel 33 indicate 1/10 of said unit, and the digits of the third number wheel 34 indicate units. If more than three number wheels were provided, the next number wheel would indicate 10 units, and so on. For example, if the unit of length is one inch, and if each complete revolution of the operating spindle 24 displaces the member 30 of the machine tool 25 through ¼ of an inch, the gearing ratio due to the gear wheels 22 and 23 should be so chosen that one complete revolution of the operating spindle 24 rotates the first number wheel 32 through 2.5 revolutions. In this case, the first digit of a number shown by the counting device 20 is a digit of the sequences 35 of different digits and indicates the distance in 1/1000 of an inch, the second digit of the number is a digit of the trains 36 of recurrent digits and indicates the distance in 1/100 of an inch, the third digit is a digit on the second number wheel 33 and indicates the distance in 1/10 of in inch, and the fourth digit is a digit on the third number wheel 34 and indicates the distance in units of an inch. Thus, in the position of the number wheels shown in Fig. 2 an operator would directly and without any computation read off the value 9.990 inches. Of course, instead of choosing 1 inch as the unit of length, the unit may be 1 cm., in which case the displacement of the machine tool member 30 on each complete revolution of the operating spindle 24, and the gearing ratio due to the gear wheels 22 and 23 for connecting the counting device 20 to the operating spindle 24 have to be suitably related to each other. Instead of providing five different digits in each sequence 35, ten different digits, or else only two different digits could be provided in which case each train 36 of recurrent digits should have the respective digit repeated ten times or two times respectively.

As a further refinement, the counting device 20 is provided with means for re-setting the counting device to zero without displacing the member 30 of the machine tool 25. To this end, the device comprises a lever 52 for setting the second and third number wheels 33 and 34 to zero in any manner well known in the art. In addition, when the handle 26 and therewith the operating spindle 24 are manually held in position, the first number wheel 32 together with the gear wheels 22 and 23 may be rotated so as to set the first number wheel 32 to zero, the gear wheel 23 rotating under friction relatively to the friction disc 53 without rotating the operating spindle 24. In this manner, it is possible to set the counting device 20 to zero at any specific initial position (herein called "datum point") of the member 30 of the machine tool 25. The counting device 20 then indicates subsequent settings of the member 30 of the machine tool 25 in direct relation to the initial datum point, whereby the possibility of accumalative setting errors is avoided or at least decreased.

The gearing ratio due to the gear wheels 22 and 23 may alternatively be so chosen that the circumference of the first number wheel rotates through an arc corresponding to the distance between adjacent digits of the sequences 35, from centre to centre, when the displacement of the member 30 of the machine tool 25 equals a multiple of $\frac{1}{1000}$ of the predetermined unit of length, whereby the digits of the sequences 35 indicate, without computation, a corresponding multiple of $\frac{1}{1000}$ of the said unit, the digits of the trains 36 indicate the same multiple of $\frac{1}{100}$ of said unit, and so on. For example, the distance of a lathe tool from the lathe centre corresponds to the length of the corresponding diameter of a cylinder; when, now, a gearing has been arranged so that a tool moves through a length of a radius of the cylinder, the diameter of the cylinder can be read off directly. Similarly, a gearing can be arranged which enables reading off directly the circumference of the cylinder.

The device described has the advantage that, in operation, the first number wheel 32 rotates with an angular speed which is, under analagous conditions, less than the angular speed of the first number wheel of an ordinary counting device. Moreover, the number of transfer mechanisms required for indicating numbers comprising a predetermined plurality of digits is reduced, since two digits are indicated by the sequences 35 and trains 36 on the first number wheel 32. Thereby wear and tear of the first number wheel and of the transfer mechanism actuated by it are reduced. Moreover, the reduction of speed makes the digits more easily perceptible for any given rate of operation. These advantages are particularly important if the counting device 20 is used for certain measuring purposes in which hitherto it was not, or not easily, possible to count the first digit by a counting device owing to the great speed which would be required from the first number wheel of a hitherto known counting device. Instead, one had to resort to micrometer dials, or if a counting device was employed at all, the first digit had still to be interpolated by means of a micrometer dial connected to the operating spindle 24. For example, in the case of a micrometer as used on machine tools, the circumference of the micrometer dial is usually subdivided into 50 units, and it is easily recognized that a number wheel of an ordinary counting device intended to count, on each revolution of the operating spindle 24, up to 50 would have to rotate with an extremely high angular speed when such spindle is rotated by an operator in the ordinary way. With the present device, it is possible to arrange for the first number wheel 32 to rotate with a speed of the order of that of the operating spindle 24 and yet to indicate, and thus to count, each unit of the assumed micrometer dial individually. Moreover, the advantage of the counting device 20 in integrating is combined with the advantage of a dial in that several digits are visible simultaneously on the same number wheel, if either for such digits (as those on the number wheels 33 and 34) a suitably large reading window 37 or 38 respectively is provided, or if viewing such digits (as those on the number wheel 32) is unobstructed, since a setting between two visible digits is more accurate and rapid than if only one digit were visible at a time.

Using a first number wheel 32 of increased size and arranging the peripheries of all the number wheels 32, 33 and 34 so that they are substantially tangential to a common plane entail, in addition, the following advantage. For constructional reasons, the size of ordinary number wheels is kept as small as conveniently possible. The transfer mechanism between such a number wheel and the next following number wheel is operative while the number wheel, after having reached a certain position, rotates through an arc corresponding to the distance between two adjacent digits, that is to say, the said following number wheel rotates together with the preceding number wheel, while the latter rotates through an angle of 36° or an arc of $\frac{1}{10}$ of its circumference. It is well known that during such transfer movement an uncertainty exists as to whether one or the next adjacent digit has to be read off from the said following number wheel. When now the first number wheel 32 has an increased size, and if the same transfer mechanism as before is being used between the first, large number wheel 32, and the second ordinary, number wheel 33, both these number wheels move together for an arc corresponding to a rotation through 36° of the second number wheel 33, but (since the length of the arc is for both number wheels the same at their peripheries) the first number wheel 32 rotates through an angle less than 36°. Thereby, the angular speed of the second number wheel 33 is greater than that of the first number wheel 32, whereby the change from one of the digits on the second number wheel 33 to the next is correspondingly accelerated and the possible uncertainty in relating the digits on the first number wheel 32 to the relevant digit on the second number wheel 33 is reduced. In other words, the transition from one digit to the next of the second number wheel 33 approaches a snapping movement if the first number wheel 32 is rotated with a speed normally arising in practice.

As indicated in Fig. 1, a second operating spindle 24' is provided for displacing the member 30 in a second direction perpendicular to the direction caused by the operating spindle 24, the operating spindle 24' being operatively connected to a second counting device 20' for indicating the second displacement. The second counting device 20' is analagous to the counting device 20 and is believed to need no further explanation.

Modifications of the embodiment so far described are possible. For example, Fig. 5 illustrates a counting device 120 in which the gear wheels 122 and 123 are so arranged that they are accommodated in a housing 154 co-axial with the first number wheel 132. An additional gear wheel 1221 is provided. After opening the housing 154 by rotating a disc 153 in anti-clockwise direction and removing it together with the handle 126, the gear wheel 123 may be replaced by a gear wheel of smaller diameter (not shown) which meshes with the additional gear wheel 1221 instead of with the gear wheel 122. Thereby it is possible to vary the gearing ratio and to adapt the numbering device 120 quickly to different purposes. For example, the gear ratio may be so selected that with one gear ratio the counting device 120 indicates inches and with another gear ratio centimetres, or, again, that with one ratio a length is directly indicated by the counting device 120, while with another gear ratio the length is automatically multiplied so as to indicate the diameter or the circumference of a circle, corresponding to said length as radius.

While in the arrangements so far described the digits of a number indicated appear one above the other, the digits on the number wheels 232, 233 and 234 of the counting device 220 of Fig. 6 are each turned through 90° so that the digits of a number indicated by the counting device 220 appear side by side to an operator actuating the handle 226 of the device for rotating its operating spindle 224, which is coupled to the first number wheel 232 of the device by means of gear wheels 222 and 223 and a worm gear 255.

In the arrangement of Fig. 7, the operating spindle 324 of a counting device 320 is coupled to the first number wheel 332 by means of three gear wheels 322, 323 and 3231. By replacing the gear wheels 323 and 3231 by other gear wheels (not shown) the gear ratio may be altered to meet different requirements. Furthermore, the counting device 320 comprises means 356 for variably presetting a predetermined number to be counted, the said means causing a control effect, when the counting device reaches the said predetermined number. The presetting means 356 may be of any suitable construction known per se, the predetermined number being visible through windows 3371 and 3381. These presetting means are of particular importance when the counting device 320 is used in connection with a machine tool; it allows, for example, to count or measure, in a suitable unit, and to predetermine the distance through which a member of the machine tool is, during the operation of the machine tool, to be displaced, and automatically to stop the operation of the machine when the predetermined displacement or measurement has been effected. For instance, a cutting tool may in this manner be preset to cut a predetermined depth only.

The counting device 420 of Figs. 8 to 14, which will now be described, comprises three number wheels 432, 433 and 434 of substantially equal diameters, a handle 426 attached to an operating spindle 424 having screw threads 427 for displacing a member 430, for example a table or slide, of a machine tool (not shown). The dash-dotted lines of Fig. 8 indicate a window which may be provided with an index line to facilitate reading. The counting device 420 is mounted on a main bracket 460 fixed to the displaceable member 430 by means of screws 461. Thus, on rotation of the operating spindle 424 the counting device 420 is displaced together with the member 430. If desired, the main bracket 460 and therewith the counting device 420 could, of course, be fixed to a stationary support interposed between the slidable member 430 and the main bracket 460.

The number wheels 432, 433 and 434 are rotatably carried by the main bracket 460. The number wheels 432, 433 and 434 comprise webs 462, 463 and 464 integral with a corcumferential ring 465, 466 and 467 respectively provided at its outer surface with digits, the arrangement of which will be explained later in greater detail, and with a knurled portion 468, 469 and 470 respectively for facilitating manual rotation of the number wheels. Within the space between the webs 463, 464 and the rings 466, 467 gear members 471 and 472 respectively are provided on hubs 473 and 474 integral with the webs 463 and 464 respectively of the number wheels 433 and 434. Springs 475 and balls 476 ratchet in teeth 477 provided on the inner walls of the circumferential rings 466 and 467 of the number wheels 433 and 434 and thus couple the gear members 471 and 472 respectively to the said number wheels. Of course, if desired the balls 476 could be replaced by rollers ratcheting in the teeth 477. Two auxiliary brackets 478 are keyed to the main bracket 460 and carry each a pinion 479 of a transfer mechanism for transferring movement from the first number wheel 432 to the second number wheel 433, and from the second number wheel 433 to the third number wheel 434, when the preceding number wheel 432 or 433 respectively passes, on rotation, through a predetermined position. A plate 482 is housed within the circumferential ring 465 and adjacent the web 462 of the first number wheel 432 and is fixed by means of screws 483 to the main bracket 460. The plate 482 holds gear members 484 and 485 by means of a stud 486. A gear member 490 is rotatably mounted on the operating spindle 424 and is provided with a shoulder on which another gear member 491 is rotatably mounted. A further gear member 484 and an auxiliary gear member 485 of different diameters are riveted together by rivets 487 and are rotatable together around the stud 486. The gear member 490 meshes with the further gear member 484, while the said other gear member 491 meshes with the auxiliary gear member 485. A plate 492 for retaining the gear members fits into the ring 465 of the first number wheel 432 and is keyed to said ring by notches 493 and complementary grooves. The retaining plate 492 is also keyed to a shoulder of the other gear member 491. A drum 494 is keyed to the shoulder of the gear member 490 and has an annular slot 495 of T-shaped cross section, in which a bolt 496 carrying a wing nut 497 can slide. A disc 500 is keyed to the operating spindle 424 and has a hole through which the bolt 496 extends. When the nut 497 is tightened on the bolt 496, the disc 500 is clamped to the drum 494.

The first number wheel 432 comprises one set of two teeth 501 (Fig. 11) for rotating the pinion 479 between the first number wheel 432 and the second number wheel 433 by one step when, on each complete revolution, the first number wheel 432 passes through a predetermined position. The said pinion 479 co-operates with teeth 503 (a hundred teeth being provided) of the adjacent gear member 471 to rotate the same, which rotation is imparted by means of the spring loaded ball 476 of the said gear member 471 to the second number wheel 433. The second number wheel 433 comprises five sets of two teeth 502 each (Fig. 12) for rotating the pinion 479 between the second number wheel 433 and the third number wheel 434 five times by one step when, on each complete revolution, the second number wheel 433 passes through five predetermined positions. The said pinion 479 co-operates with teeth 503 (again a hundred such teeth are provided) of the adjacent gear member 472 to rotate the same, which rotation is imparted by means of the spring loaded ball 476 of the said gear member 472 to the third number wheel 434.

The first number wheel 432 accommodates on its periphery ten sequences 435 each composed of different digits "2, 4, 6, 8, 0" (see particularly Fig. 9) and ten trains 436 each composed of a different recurrent digit, which is repeated five times in each train. The first number wheel 432 has also a hundred markings 441 for facilitating reading off. The second number wheel accommodates on its periphery five series 4351 each composed of the digits "1, 2, 3, ... 0," the arrangement being such that the series 4351 on the second number wheel 433 lies adjacent the trains 436 on the first number wheel 432. The third number wheel 434 accommodates on its periphery the digits "0, 1, 2, ... 49."

The arrangement of Figs. 8 to 14 operates as follows:

When the wing nut 497 is loosened and the operating spindle 424 is rotated by means of the handle 426, the member 430 and the counting device 420 are displaced in the axial direction of the spindle 424. The disc 500 keyed to the operating spindle 424 is rotated therewith and carries the bolt 496 with it which slides in the annular slot 495. No counting by the counting device takes place. Thus, the member 430 may be set to a datum point by operating the handle 426 and without influencing the counting device.

When now the wing nut 497 is tightened on the bolt 496, the disc 500 is clamped to the drum 494. On rotation of the operating spindle 424 by means of the handle 426, the member 430 and the counting device are displaced as before, but the disc 500 keyed to, and rotating with, the operative spindle 424 rotates the drum 494 which in turn rotates the gear member 490 keyed to the drum 494. The gear member 490 meshes with the further gear member 484 to which the auxiliary gear member 485 is riveted. The further gear member 484 and the auxiliary gear member 485 rotate together around the stud 486. The auxiliary gear member 485 meshes with the other gear member 491 and rotates the same around the shoulder of the said gear member 490. The said other gear member 491 rotates the retaining plate 492 which is keyed to the first number wheel 432. By suitably relating the pitch of the screw threads 427 on the operating spindle 424 to the gear ratio of the mechanism coupling the operating spindle 424 to the first number wheel 432 it can be achieved that the first number wheel 432 rotates through an arc corresponding to the distance between adjacent markings 441 thereon when the member 430 has been displaced a distance equalling $\frac{1}{1000}$ of a suitable unit of length. It will easily be seen, that in this case the digits of the sequences 435 indicate $\frac{2}{1000}$ of such a unit and the digits of the trains 436 indicate $\frac{1}{100}$ of the unit.

One complete revolution of the first number wheel 432 represents $\frac{1}{10}$ of the unit. Moreover, when on each complete revolution the first number wheel 432 has just indicated the first two digits "98" of a number and passes on to "00" the rotation is transferred to the second number wheel 433 which is rotated forward by one step so as now to indicate the next digit, which is the third digit of a number being indicated by the device and represents $\frac{1}{10}$ of the unit. As explained above, the movement of the second number wheel 433 during one complete revolution thereof is transferred five times to the third number wheel 434, such transfer of movement taking place whenever the indication of the second number wheel 433 changes from the digit "9" of one series of digits 4351 to the digit "0" of the next series. The second number wheel 433 is graduated into 50 parts, namely the digits "0" to "9" five times, so that $\frac{1}{5}$ of a complete revolution of the second number wheel 433 represents one unit. The third number wheel 434 indicates integral units and comprises the digits "0" to "49." With the construction illustrated, the device can count up to 49.999 units in steps of 0.001 unit. As before, the unit may be an inch or a centimetre.

When it is desired after a count to reset the counting device 420 to zero, the wing nut 497 and therewith the bolt 496 are loosened so that the drum 494 is no longer clamped to the disc 500. It is then possible to rotate each of the number wheels 432, 433 and 434 separately and manually to zero by means of the knurled portion 468, 469 and 470 of the number wheels while the spring loaded balls 476 of the gear members 471 and 472 ratchet over the teeth 477 of the number wheels 433 and 434 and the bolt 496 glides in the annular slot 495. Owing to the ratcheting of the balls 476 over the teeth 477 it is possible to return the number wheels 433 and 434 to zero without rotating the pinions 479 which, in turn, owing to the high gear ratio between the pinions 479 and the teeth 503 act as brakes on the gear members 471 and 472.

To give a more specific example, let it be assumed that the unit is 1 inch and the the pitch of the screw threads 427 is such that the member 430 is displaced through 0.125 inch by one complete revolution of the operating spindle 424. In order to indicate on the counting device 0.125 inch, the first number wheel 432 starting from zero has to perform 1.25 revolutions or 5/4 times the number of revolutions of the operating spindle 424 and the handle 426 actuating the same. Therefore, the gear members 490, 491, 485, 484 should be so designed that they afford a gear ratio 5 to 4. The said gear members 490, 491, 485, 484 can easily be exchanged against other similar gear members affording a different gear ratio by removing first the wing nut 497 and subsequently the disc 500, the drum 494 and the retaining plate 492 and then inserting the other gear members and re-attaching the said drum, disc and wing nut. In this manner, the device may easily be adapted to different requirements, for example to different units of displacement without the necessity of re-designing the entire counting device.

It should be clearly understood that the embodiments herein described and illustrated in the accompanying drawings are given by way of example only. Many further modifications, additions and omissions are possible without departing from the spirit of the invention.

I claim:

1. A counting device comprising a rotatable first number wheel, at least one other rotatable number wheel, a transfer mechanism for transferring rotation of said first number wheel to said other number wheel only when said first number wheel rotates through a predetermined position, a dial on said first number wheel and rotatable therewith, a dial on said other number wheel and rotatable therewith, a plurality of serially arranged sequences of different digits on the dial of said first number wheel, an equal plurality of serially arranged trains of recurrent digits on the dial of the said first number wheel, the sequences and trains of digits being arranged side by side, a scale of digits on the dial of said other number wheel, the arrangement being such that the first digit of a number counted is indicated by a digit of one of said sequences, the second digit of said number is indicated by a digit of one of said trains and the third digit of said number is indicated by a digit of said scale, a rotatable spindle, a gear coupling the first number wheel to said rotatable spindle for operating the counting device, a member displaceable in the axial direction of said operating spindle, and means coupling said member to said operating spindle for displacing the said member by rotating the said operating spindle, the said gear having a gearing ratio for enabling the counting device to indicate a number dependent on the length, measured in a predetermined unit, of the displacement of said member.

2. A counting device as claimed in claim 1, wherein the first number wheel has a diameter sufficiently large for the sequences and trains of digits to be accommodated on the said number wheel in a size rendering the said digits readable from the said number wheel by the unaided normal eye.

3. A counting device as claimed in claim 2, wherein the first number wheel has a larger diameter than the other number wheel and is arranged eccentrically with respect to said other number wheel for enabling all the digits of a number indicated by the device to be in substantial alignment.

4. A counting device as claimed in claim 2, wherein all the number wheels are of substantially equal size and are arranged co-axially.

5. A counting device as claimed in claim 3, wherein the sequences, trains and the scale of digits are arranged along the periphery of the respective number wheel, the peripheries of the first and other number wheels being substantially tangential to a common plane.

6. A counting device as claimed in claim 4, wherein the scale of the said other number wheel comprises a plurality of sequences of different digits.

7. A counting device as claimed in claim 4, wherein the plurality of sequences and trains of digits of the said first number wheel is ten, the plurality of sequences of digits of the said other number wheel is five, a third number wheel being provided next adjacent the said other number wheel, the transfer mechanism between the said other and the said third number wheels transferring, during one complete revolution of the second number wheel, rotation of the said other number wheel only five times to the said third number wheel, namely each time the said other number wheel rotates through one of five predetermined positions, adjacent positions being separated from each other by arcs corresponding substantially to 72°.

8. A counting device as claimed in claim 7, wherein a further scale of digits is arranged on the said third number wheel, the said further scale comprising the digits "0, 1, 2 . . . 48, 49."

9. A counting device as claimed in claim 1, wherein means are provided for varying the gear ratio to meet different requirements.

10. A counting device as claimed in claim 1, wherein the operating spindle is arranged parallel to the axis of the first number wheel.

11. A counting device as claimed in claim 1, wherein the operating spindle is arranged co-axially with the first number wheel.

12. A counting device as claimed in claim 1, wherein the operating spindle is arranged substantially perpendicularly to the axis of the first number wheel.

13. A counting device as claimed in claim 1, wherein the operating spindle is arranged parallel to the axis of the first number wheel, the gear comprising two gear wheels in meshing engagement with each other.

14. A counting device as claimed in claim 1, wherein the operating spindle is arranged parallel to the axis of the first number wheel, the gear comprising three gear wheels in meshing engagement with one another.

15. A counting device as claimed in claim 1, wherein the operating spindle is arranged substantially perpendicularly to the axis of the first number wheel, the gear comprising two gear wheels and a worm gear.

References Cited in the file of this patent

UNITED STATES PATENTS

| Number | Name | Date |
|---|---|---|
| 324,042 | Shepard | Aug. 11, 1885 |
| 701,876 | Gordon | June 10, 1902 |
| 750,086 | Carroll | Jan. 19, 1904 |
| 1,349,256 | Bechtold | Aug. 10, 1920 |
| 1,482,596 | Berge | Feb. 5, 1924 |
| 1,542,465 | Macgill | June 16, 1925 |
| 1,592,568 | Orth | July 13, 1926 |
| 1,764,959 | Johnston et al. | June 17, 1930 |
| 2,140,839 | Hennessy | Dec. 20, 1938 |
| 2,273,956 | Hall | Feb. 24, 1942 |
| 2,322,712 | Hazard | June 22, 1943 |